INVENTOR.
E. W. MELLOW
BY Hudson + Young
ATTORNEYS

United States Patent Office 3,074,919
Patented Jan. 22, 1963

3,074,919
POLYMERIZATION CONTROL
Ernest W. Mellow, Bartlesville, Okla., assignor to Phillips Petroleum Company, a corporation of Delaware
Filed July 30, 1956, Ser. No. 601,075
10 Claims. (Cl. 260—93.7)

This invention relates to the control of monomer polymerization. In one of its aspects, this invention relates to control of polymerization rate at constant temperatures.

In the polymerization of various monomers in the presence of a catalyst, said catalyst having varying activity, various methods have been devised for controlling the polymerization. It is frequently advantageous to carry out such polymerization at constant temperatures to obtain uniform products. At the same time, it is desirable to carry out such reactions at substantially constant rates. However, such desirable results are not necessarily directly related, the rate being dependent upon catalyst activity and the temperature being dependent upon heat of reaction vs. rate of heat removal.

This invention is applicable to control of polymerization reactions employing catalyst broadly. It is particularly advantageous to those polymerizations employing solid catalyst since such catalyst activity is dependent upon many factors such as activation, presence or absence of catalyst poisons, porosity of carrier or catalyst, etc., and such activity varies considerably from batch to batch. This invention is particularly advantageous in the polymerization of 1-olefins in presence of solid catalyst.

It has been recently discovered that 1-olefins having a maximum of 8 carbon atoms per molecule and no branching nearer the double bond than the 4-position can be polymerized to solid and semi-solid polymers at low temperatures and pressures as compared with conventional processes for polymerizing these olefins. Such polymerization is generally carried out by first admixing and at least partially dissolving the olefins in a non-polymerizable solvent and carrying out the polymerization in the presence of a catalyst.

In the copending application of Hogan et al., filed December 20, 1954, and having Serial No. 476,306, a process is disclosed for producing novel polymers of 1-olefins by carrying out the polymerization at a temperature in the range of 100 to 500° F. in the presence of 0.1 to 10 or more weight percent of chromium as chromium oxide, including a substantial proportion of hexavalent chromium associated with at least one porous oxide selected from the group consisting of silica, alumina, zirconia and thoria. A preferred catalyst is one comprising 0.1 to 10 weight percent chromium as the oxide on a silica-alumina support such as 90 percent silica-10 percent alumina. This catalyst is ordinarily a highly oxidized catalyst which has been activated by high-temperature treatment under non-reducing conditions and preferably with an oxidizing gas. Olefins, other than 1-olefins as described, are polymerized by the action of this catalyst but many of the resulting polymers are preponderantly normally liquid at least when polymerized under the described conditions. The polymerization is suitably carried out in the liquid phase such as in solution in a hydrocarbon solvent, especially a paraffin or naphthene which is liquid under the polymerization conditions; however, vapor phase operation or mixed phase operation can be effected. Also, diolefins can be polymerized by the chromium oxide catalyst to produce solid polymers. While this invention is particularly applicable to such 1-olefin polymerization, it is applicable to polymers broadly and other catalyst systems such as the organometal catalyst disclosed in Belgian Patent 533,362, November 16, 1954, to Karl Ziegler.

An object of this invention is to provide a system of controlling both temperature and reaction rate in a polymerization reaction.

Another object of this invention is to provide suitable apparatus for controlling both the reaction rate and temperature in a polymerization reactor.

Other objects, advantages and features of this invention will be apparent to those skilled in the art having been given this disclosure.

According to this invention, the catalyst feed rate to a polymerization zone is regulated responsive to exothermic heat release. In one specific embodiment, the polymerization reaction temperature is controlled by varying the rate of heat removal responsive to temperature changes and the polymerization rate is controlled by varying the catalyst input responsive to said rate of heat removal.

As previously indicated, the polymeric materials to which this invention is particularly applicable are polymers of 1-olefins. Polymers of 1-olefins containing 2 to 8 carbon atoms and having no branching nearer the double bond than the 4-position have been found in recent years to have superior heat resistance and low temperature properties when polymerized at relatively low temperatures and pressures. The above-identified method of Hogan et al. is one such low-temperature low-pressure method. As indicated above, it is preferable to carry out the polymerization in a hydrocarbon solvent.

Examples of the preferred 1-olefins include ethylene, propylene, 1-butene, 1-pentene, 1-hexene, 1-octene, 4-methyl-1-pentene, 4-methyl-1-hexene, 5-ethyl-1-hexene, 6-methyl-1-heptene, 4-ethyl-1-hexene, and the like.

The solvents especially useful in polymerization of the 1-olefins are hydrocarbons and preferably paraffins including cycloparaffins. These diluents include paraffins and cycloparaffins having 3 to 12 carbon atoms per molecule. Any of the paraffins or cycloparaffins which are solvents for the polymer at the temperature in the polymerization range are suitable. Any hydrocarbon which is relatively inert, non-deleterious, and liquid under the operating conditions of the process can be utilized. Diluents that have been used successfully in the polymerization reaction and are operable in this invention include propane, isobutane, normal pentane, isopentane, isooctane (2,2,4-trimethylpentane), cyclohexane and methylcyclohexane. Unsaturated aliphatic and cyclic hydrocarbons are, in general, not used in the polymerization reaction since they are likely to enter the polymerization reaction. However, any of these hydrocarbons are operable in the present invention.

This invention can best be described by referring to a typical polymerization. As has been indicated, ethylene polymerized in the presence of a chromium oxide catalyst on a silica-alumina support has recently come into prominence and, for that reason, I will refer to such a polymerization in this discussion. The invention will be further described with reference to the attached drawings of which:

Figure 1:
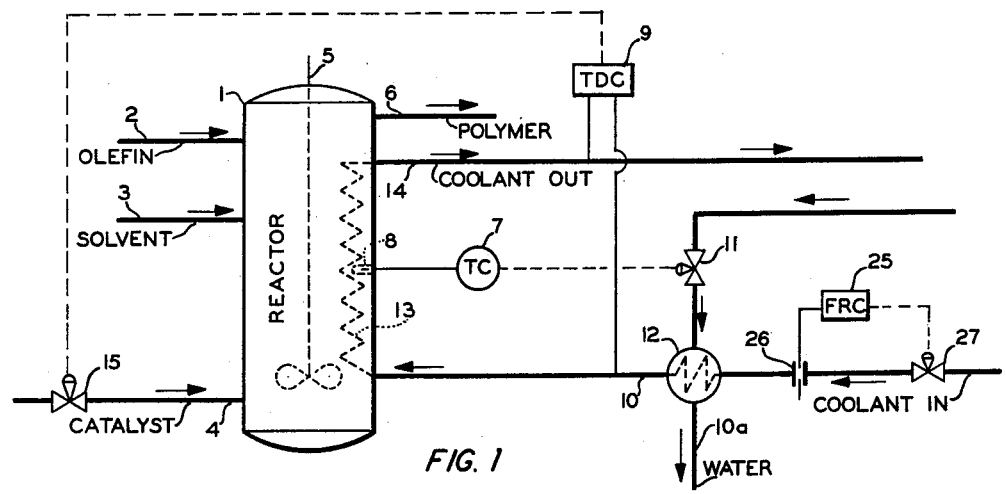
FIGURE 1 is a schematic flow diagram wherein the reaction zone temperature is controlled by varying the coolant temperature.

Referring to the drawing, ethylene, solvent and catalyst is continuously admitted to reaction vessel 1 via conduits 2, 3 and 4, respectively. The mixture is continuously stirred via stirrer 5 and polymer solution and catalyst is continuously removed via conduit 6. The polymer solution and catalyst are subsequently separated or further treated by any desirable means, this not being a part of my invention. For the purpose of this discussion, it is assumed that the desired operating temperature is 280° F.

Referring to FIGURE 1, wherein the coolant flow rate is constant, temperature controller 7 is connected to thermocouple 8 and continuously detects the temperature in the reactor 1. With a given catalyst activity and rate, the reaction rate is constant. Now if the catalyst activity changes, the rate of polymerization changes which will be reflected in a change of temperature which will be detected by thermocouple 8. Temperature controller 7 is operatively set to operate valve 11 which determines the flow of cool water to exchanger 12. This rate of flow will control the temperature of coolant in conduit 10, said coolant being controlled at a constant flow rate by flow rate controller 25 which is operatively connected to detect the rate of flow through orifice 26 in conduit 10 and is operatively connected to open or close valve 27 responsive to changes in said rate of flow to maintain the rate constant. Now when controller 7 registers a rise in temperature, it causes valve 11 to open sending more cooling water to exchanger 12 and thereby lowering the temperature of the coolant. This coolant from conduit 10 passes through exchanger 13 in the reactor and is removed via conduit 14. Now this will control the temperature, however, the reaction rate has increased generating more heat. But since it is necessary to control the reaction rate also, controller 9 is set connected to coolant inlet conduit 10 and outlet 14 to detect temperature differential and it is so connected to valve 15 that it changes the catalyst rate to the reactor, in this case lowering the rate. When the reaction rate is back in control, temperature controller 7 will continue to control at the desired level and the catalyst addition is balanced to control the reaction rate. The new rate of catalyst flow will again allow the coolant temperature to return to normal; however, the catalyst rate will not be disturbed unless the coolant temperature rise changes from the desired or predetermined value.

Figure 2:
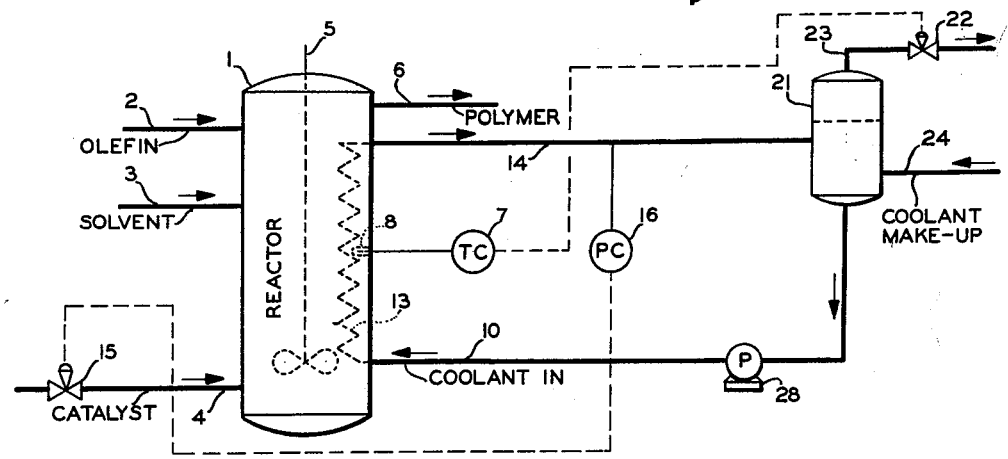
FIGURE 2 is a schematic flow diagram wherein the coolant is a boiling liquid and the temperature is controlled by controlling pressure on the coolant.

Referring to FIGURE 2, wherein the cooling is provided by means of a boiling liquid, the coolant outlet conduit 14 is connected to coolant supply tank 21 wherein the coolant is allowed to form a boiling phase and the temperature is regulated by controlling the pressure by means of valve 22 on overhead conduit 23. This conduit passes to a coolant liquification zone, not shown, and coolant makeup is returned to the vessel 21 via conduit 24. The coolant from vessel 21 is supplied to the reactor cooling coil via pump 28 and conduit 10. The temperature controller 7 is connected to detect the temperature of the reactions as described in conjunction with FIGURE 1. This controller 7 is also operatively connected to valve 22 to change the pressure on vessel 21 responsive to changes in temperature of the reaction. Pressure controller 16 then is connected to detect the pressure in conduit 14 and is operatively connected to valve 15 to control the rate of catalyst input responsive to changes in pressure in conduit 14. The operation is then essentially that as described in conjunction with FIGURE 1.

Figure 3:
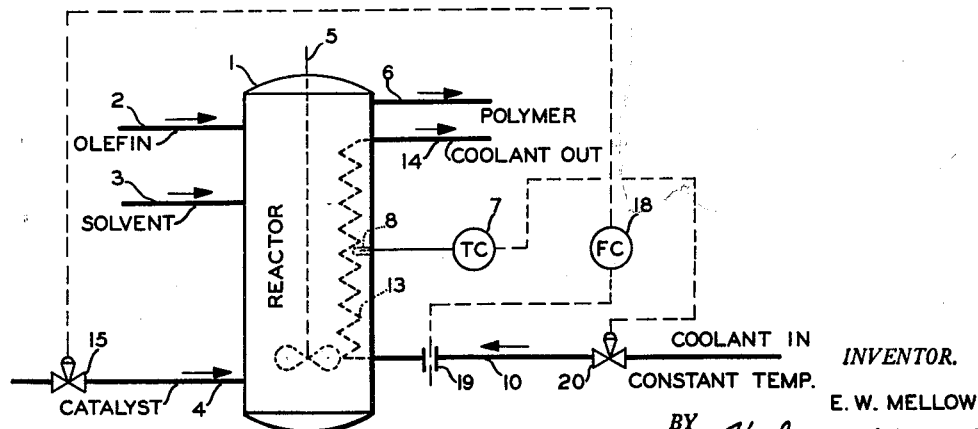
FIGURE 3 is a schematic flow diagram wherein the reaction temperature is controlled by control of rate of coolant flow.

Referring to FIGURE 3 wherein the coolant has a constant temperature, the temperature controller is connected to control the rate of flow of coolant through valve 20. The flow of the coolant through the orifice is continuously detected by flow controller 18 which in turn controls the catalyst flow rate by being connected to valve 15 and the operation is essentially that as described in conjunction with FIGURE 1.

It will be obvious to those skilled in the art that this method of control has a definite advantage over controlling the catalyst rate by temperature of the reactor since the reactor temperature is held substantially constant. This has been pointed out. This temperature can be held constant even though reaction rate may vary widely by simply removing more or less heat. By the practice of this invention, the catalyst rate is controlled as a function of the rate of heat removal from the reactor, this rate being measured by detecting either the temperature rise of the coolant through the reactor, the pressure of the coolant leaving the reactor, or the flow rate of the coolant entering the reactor at a constant temperature. Thus, when the reaction rate increases, for example, the controller which detects the resulting increase in rate of heat removal then acts to reduce the rate of catalyst introduction, thereby returning the reaction rate to its predetermined value.

Those skilled in the art will see many modifications which can be made. For example, the exchanger 13 can be a jacket or other heat exchange means than the coil as shown. The coolant temperature can be changed by regulation or refrigeration means instead of cooling by heat exchange. Brine or other refrigerant other than water can be used. The coolant temperature in FIGURE 2 can be detected rather than pressure since the pressure and temperature are directly related. Pumps, valves, etc., can be supplied by the art for control of the various streams. The temperature controller, pressure controller and the like are well known in the art and need not be further discussed herein. The catalyst can be added to the solvent stream, or some solvent can be premixed with catalyst. The catalyst can be added in the form of a slurry with a hydrocarbon solvent of the type described herein. The monomer and solvent can be premixed, if desired. Those skilled in the art will see many such modifications.

*Specific Embodiment*

A specific embodiment will now be described using a boiling liquid as the coolant as in FIGURE 2. Ethylene at the rate of 81 pounds per hour, cyclohexane at the rate of 838 pounds per hour and containing 8 pounds per hour of ethylene, and chromium oxide catalyst at the rate of 2 pounds per hour is admitted to the reactor wherein the temperature is 290° F. and the pressure is 500 p.s.i.a. The reactants are constantly agitated and the ethylene polymerizes. The product stream of 929 pounds per hour consists of 60 pounds of polymer, 29 pounds of unreacted ethylene and 838 pounds of cyclohexane. The reaction temperature is controlled with boiling cyclohexane at 40 p.s.i.a. and 245° F.

If the reaction rate decreases, as a result of lower catalyst activity, for example, the rate of heat removal required to maintain a constant reactor temperature becomes less. Temperature controller 7 causes valve 22 to move toward the closed position, increasing the pressure on the boiling coolant, thereby raising the coolant temperature and decreasing the rate of heat removal. This increase in pressure is detected by pressure contoller 16, which then acts to open valve 15, increasing the rate of catalyst addition. The increased catalyst concentration results in an increased reaction rate and hence heat must be removed at a higher rate to maintain the desired reactor temperature. Temperature controller 7 causes valve 22 to open to the extent necessary to maintain the preselected reactor temperature (e.g. 290° F.), pressure controller 16 detects the new coolant pressure and readjusts the catalyst rate accordingly, and the system thus stabilizes at a new catalyst rate while maintaining the reactor temperature and reaction rate substantially constant.

I claim:

1. A method of control for a polymerization process wherein monomers are polymerized in the presence of a solvent and a solid catalyst and wherein the polymerization components are added continuously to and withdrawn continuously from the reaction zone and wherein reaction heat is removed in a coolant in indirect heat exchange with polymerization admixture, said method comprising controlling the reaction temperature by varying the coolant temperature responsive to changes in reaction temperature to hold said reaction temperature substantially constant and regulating the rate of catalyst addition responsive to coolant temperature so as to maintain the reaction rate substantially constant.

2. The method of claim 1 wherein the monomer is a 1-olefin of 2 to 8 carbon atoms per molecule and having no branching nearer the double bond than the 4-position and wherein the solid catalyst is a chromium oxide catalyst comprising a substantial amount of hexavalent chromium associated with 90 to 99.9 weight percent of a porous oxide selected from the group consisting of silica, alumina, zirconia and thoria and the polymerization temperature is a temperature within the range of 100 and 500° F.

3. A control method for a polymerization process wherein monomers, solvent and catalyst are continuously passed to a polymerization zone, polymer, solvent and catalyst are continuously withdrawn from said polymerization zone and the heat of reaction is removed by boiling a vaporizable liquid in indirect heat exchange relationship with said polymerization zone, said control method comprising regulating the pressure on said vaporizable liquid responsive to temperature change in said polymerization zone so as to maintain said temperature substantially constant, and regulating the rate of catalyst flow to said polymerization zone responsive to the pressure on said vaporizable liquid to maintain the heat evolution in said polymerization zone substantially constant.

4. The method of claim 4 wherein the monomer is a 1-olefin of 2 to 8 carbon atoms per molecule and having no branching nearer the double bond than the 4-position and wherein the solid catalyst is a chromium oxide catalyst comprising a substantial amount of hexavalent chromium associated with 90 to 99.9 weight percent of a porous oxide selected from the group consisting of silica, alumina, zirconia and thoria and the polymerization temperature is a temperature within the range of 100 and 500° F.

5. A control method for a polymerization process wherein monomers, solvent, and catalyst are continuously passed to a polymerization zone, polymer, solvent and catalyst are continuously withdrawn from said polymerization zone and the heat of reaction is removed by varying the rate of flow of a constant temperature coolant in indirect heat exchange relationship with said polymerization zone, said control method comprising regulating the rate of flow of said coolant responsive to temperature change in said polymerization zone so as to maintain said temperature substantially constant and regulating the rate of catalyst flow to said polymerization zone responsive to changes in said rate of flow of said coolant to maintain the rate of heat evolution in said polymerization zone substantially constant.

6. The method of claim 5 wherein the monomer is a 1-olefin of 2 to 8 carbon atoms per molecule and having no branching nearer the double bond than the 4-position and wherein the solid catalyst is a chromium oxide catalyst comprising a substantial amount of hexavalent chromium associated with 90 to 99.9 weight percent of a porous oxide selected from the group consisting of silica, alumina, zirconia and thoria and the polymerization temperature is a temperature within the range of 100 and 500° F.

7. A control apparatus for controlling the polymerization conditions in a reaction vessel, said vessel comprising means for introducing solvent, monomer and catalyst into said vessel, means for agitating the contents of said vessel, means for removing product from said vessel and heat exchange means for removing heat from said vessel, said control apparatus comprising, in combination, means for continuously detecting the temperature in said vessel, means operatively connected to the temperature detecting means for controlling the rate of heat removed from said reaction vessel responsive to changes in the temperature detected, means for detecting changes in rate of heat removal from said reaction vessel, and means for regulating the rate of catalyst flow in said catalyst introducing means responsive to change in said rate of heat removal.

8. A control apparatus for controlling the polymerization conditions in a reaction vessel, said vessel comprising means for introducing solvent, monomer and catalyst into said vessel, means for agitating the contents of said vessel, means for removing product from said vessel and means for passing a coolant in indirect heat exchange relationship with the contents of said vessel, said control apparatus comprising, in combination, means for continuously detecting the temperature in said vessel, means operatively connected to said temperature detecting means for controlling the temperature of coolant in said means for passing coolant in indirect heat exchange relationship with the contents of said vessel responsive to changes in temperature detected, and means for detecting changes in said coolant temperature operatively connected to said means for introducing catalyst to control the rate of catalyst introduction responsive to changes in said coolant temperature.

9. A control apparatus for controlling the polymerization conditions in a reaction vessel, said vessel comprising means for introducing solvent, monomer, and catalyst into said vessel, means for agitating the contents of said vessel, means for removing product from said vessel and means for passing a coolant in indirect heat exchange relationship with the contents of said vessel, said control apparatus comprising, in combination, means for continuously detecting the temperature in said vessel, means operatively connected to said temperature detecting means for controlling the rate of flow of coolant through said means for passing coolant in indirect heat exchange relationship with the contents of said vessel responsive to changes in temperature detected, and means for detecting changes in said coolant rate of flow operatively connected to said means for introducing catalyst to control the rate of catalyst introduction responsive to changes in said rate of flow of said coolant.

10. A control apparatus for controlling the polymerization conditions in a reaction vessel, said vessel comprising means for introducing solvent, monomer, and catalyst into said vessel, means for agitating the contents of said vessel, means for removing product from said vessel, and means for evaporating a coolant in indirect heat exchange relationship with the contents of said vessel, said control apparatus comprising, in combination, means for continuously detecting the temperature in said vessel, means operatively connected to said temperature detecting means for controlling the pressure on said coolant, and means for detecting changes in said pressure operatively connected to said means for introducing catalyst to control the rate of catalyst introduction responsive to changes in said pressure of said coolant.

References Cited in the file of this patent

UNITED STATES PATENTS

| | | |
|---|---|---|
| 1,624,294 | Wallace et al. | Apr. 2, 1927 |
| 2,402,137 | Hanford et al. | June 18, 1946 |
| 2,440,822 | Hachmuth | May 4, 1948 |
| 2,497,323 | Roedel | Feb. 14, 1950 |
| 2,518,307 | Groeke | Aug. 8, 1950 |
| 2,570,056 | Halbig | Oct. 2, 1951 |
| 2,590,436 | Luten | Mar. 25, 1952 |
| 2,665,197 | Rowland | Jan. 5, 1954 |
| 2,683,141 | Erchak | July 6, 1954 |
| 2,692,257 | Zletz | Oct. 19, 1954 |
| 2,728,753 | Russum et al. | Dec. 27, 1955 |
| 2,752,291 | Rex | June 26, 1956 |
| 2,897,183 | Christl et al. | July 28, 1959 |